(12) United States Patent
Dawson

(10) Patent No.: US 7,066,137 B1
(45) Date of Patent: Jun. 27, 2006

(54) ANTI DETONATION DEVICE AND METHOD FOR INTERNAL COMBUSTION ENGINES

(76) Inventor: Ralph E. Dawson, 277 Camby Dr., Kingsport, TN (US) 37664

( * ) Notice: Subject to any disclaimer, the term of this patent is extended or adjusted under 35 U.S.C. 154(b) by 0 days.

(21) Appl. No.: 10/980,486

(22) Filed: Nov. 3, 2004

Related U.S. Application Data

(60) Provisional application No. 60/516,400, filed on Nov. 3, 2003.

(51) Int. Cl.
F02B 19/00 (2006.01)

(52) U.S. Cl. .................. 123/266; 123/268; 123/291

(58) Field of Classification Search .............. 123/266, 123/267, 268, 286, 291, 293
See application file for complete search history.

(56) References Cited

U.S. PATENT DOCUMENTS

| | | | | |
|---|---|---|---|---|
| 4,327,681 A | * | 5/1982 | Latsch et al. ............... | 123/260 |
| 4,332,224 A | * | 6/1982 | Latsch et al. ............... | 123/254 |
| 4,930,473 A | * | 6/1990 | Dietrich ..................... | 123/266 |
| 4,987,868 A | * | 1/1991 | Richardson ................ | 123/260 |
| 5,024,193 A | * | 6/1991 | Graze, Jr. .................. | 123/259 |
| 5,105,780 A | * | 4/1992 | Richardson ................ | 123/263 |

* cited by examiner

Primary Examiner—John T. Kwon

(57) ABSTRACT

A flame ejector device for mounting in the spark plug aperture of an internal combustion engine whereby an inner end of the device is within the combustion chamber, the device being configured to receive a fuel-air mixture charge on the compression stroke of the piston and wherein the charge is ignited by a conventional spark plug mounted on the device, a unique arrangement and orientation of flame ejector nozzles on the inner end of the device for ejecting flame fronts toward predetermined areas within the combustion chamber to maximize fuel burning, to avoid engine knocking, and to prevent direct impingement of flame on metal portions contiguous the chamber which are susceptible to burning or heat damage.

16 Claims, 4 Drawing Sheets

Nossle Design Variations
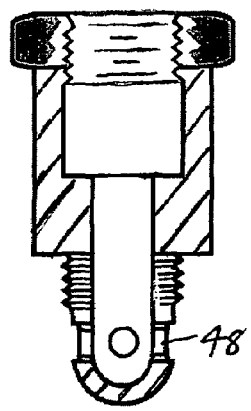
FIG. 2 Straight Bore
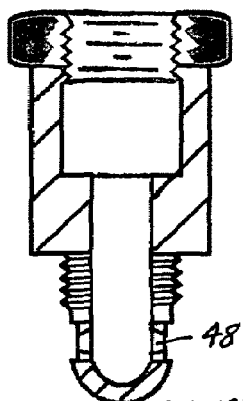
FIG. 3 Converging Bore
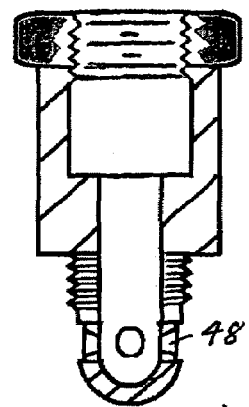
FIG. 4 Diverging Bore
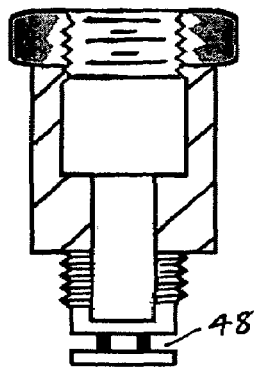
FIG. 5 Slot Bore
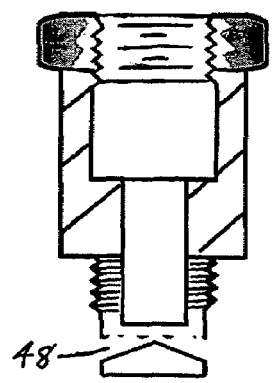
FIG. 6 Wedge bore

US 7,066,137 B1

ANTI DETONATION DEVICE AND METHOD FOR INTERNAL COMBUSTION ENGINES

This application is based upon and claims priority under 35 U.S.C. 119(e)(1) based on Applicants Provisional U.S. Patent Application Ser. No. 60/516,400 filed Nov. 3, 2003 of same inventor and titled "Anti Detonation Device for Internal Combustion Engines".

BACKGROUND OF THE INVENTION

1. Field

This invention broadly concerns a uniquely constructed fuel ignition device and method for initiating combustion of fuel (carburetor or fuel injection) in the combustion chamber of internal combustion engines.

Detonation in the combustion chamber of an internal combustion engine is very destructive in that it causes significant damage such as breaking piston rings, burning holes in pistons, and destroying piston ring lands. The present invention will essentially eliminate detonation in the combustion chamber of an internal combustion engine.

Detonation occurs in conventional engines when an appreciable portion of the fuel/air charge ignites due to spontaneous combustion. This spontaneous combustion results from the last portion of the last fraction of the fuel-air charge in the combustion chamber being subjected to high pressure and temperature. As the spark plug ignites the fuel-air mixture in the combustion chamber a flame/pressure front is created. This flame/pressure front burns across the combustion chamber. As the flame front expands it causes an increase in pressure in areas outside of the flame front which compresses the remaining fuel-air mixture. This compression causes an increase in temperature high enough to bring about decomposition of fuel remaining in the areas outside the flame front. The fuel breaks into lower molecular weight compounds which have much lower auto ignition temperatures than the original fuel. As compression increases, a corresponding increase in temperature occurs which causes these lower molecular weight compounds to auto-ignite/detonate in front of the flame front. Auto-ignition/detonation of un-decomposed fuel ahead of the flame front can also occur if the pressure/temperature increase in front of the flame front is great enough and the time lag is long enough. This Detonation occurs in areas not yet ignited by the flame front caused by spark plug ignition.

2. Prior Art

Typical prior art devices which employ what is termed a "pre-combustion" chamber, is disclosed in U.S. Pat. No. 5,924,402 wherein the transfer passages 52 are designed to be angled symmetrically about an axis "A". This structure and angle are obviously not intended to be able to direct any of the ejected flame in a generally horizontal direction or otherwise variable direction and, it would appear, could lead to burning of the piston tops of conventional engines.

The time lag between spark plug ignition and auto-ignition (detonation) depends upon the flame front speed. In accordance with the present invention, it has been discovered that if the flame ejection speed from the ejector nozzle were high enough, and if the flame front were directed towards fuel concentrations, typically the greatest fuel-air volume areas, within the head combustion chamber, the flame front would reach the fuel in the auto-ignition areas before detonation could occur. The device described in detail below will essentially eliminate the detonation by igniting significantly more of the fuel air mixture over a larger initial area by flame ejection speed and directioning, which will reduce the time required for the flame front to travel through the whole fuel air charge in the combustion chamber.

The present device consists of an ignition source such as a conventional spark plug, a fuel air cavity, acceleration tube, and ejection nozzles or ports. On the compression stroke of the piston the following events occur:

1. the fuel air mixture is compressed through the ejection nozzle of the device and upward in the acceleration tube into the fuel air cavity;
2. a timed spark then ignites the fuel in the cavity;
3. the temperature and pressure start to build in the cavity;
4. the flame accelerates down the acceleration tube igniting more fuel as it goes;
5. by the time the flame exits the nozzle it is traveling much faster than what the flame speed would have been if ignited by a conventionally positioned spark plug in the combustion chamber;
6. in addition the fuel is ignited at multiple points depending on the number of ejection nozzles;
7. because the flame exiting the nozzle is under high pressure and is travelling faster than the flame front in the lower pressure combustion chamber, the flame from the nozzle penetrates into the combustion chamber; and
8. the fuel air mixture in the combustion chamber is ignited from numerous locations from the flames ejected from the multiple nozzles which are designedly directionally oriented toward fuel concentrations.

The time lag from ignition in the fuel/air cavity to the flame front reaching all the way across the combustion chamber is greatly reduced as compared to the time lag experienced with a single source ignition like a spark plug in a conventional combustion chamber.

SUMMARY OF THE INVENTION

The present invention in its structural embodiment is directed to a flame ejector device having a body into which a spark plug of an internal combustion engine can be screwed, which body has a fuel-air cavity formed therein and communicating with the electrodes of the spark plug, wherein flame ejector nozzles are provided through a lower portion of the body, wherein the body is provided above the nozzles with threads adapted to thread into a spark plug port of the engine, and wherein the ejection axes of said nozzles are mainly oriented generally horizontally across the combustion chambers toward fuel concentration regions within the combustion chamber of the engine, rather than axially thereof.

A preferred method embodiment is given below in steps (A) through (B) which steps can be arranged in any order convenient to the manufacturer, for manufacturing the present ejector device for subsequent assembly in the head of an internal combustion engine having a piston reciprocably mounted in a cylinder, wherein a combustion chamber is provided in the head, wherein the combustion chamber has a volumetric median plane oriented normally to a reciprocation axis of the piston, and wherein a threaded spark plug aperture is provided through the head and into communication with the combustion chamber, said method comprising (A) determining the type and orientation of flame ejector ports desired for a particular combustion chamber, (B) providing a flame ejector structure comprising elongated wall means forming a body having a longitudinal axis, a closed proximal end portion and an open distal end portion and an intermediate portion, a fluid flow passage formed generally axially through said body from said open distal end portion to said closed proximal end portion, said distal end portion having axially oriented internal threads for threadedly receiving a spark plug whereby the electrode elements of the plug will be in communication with said passage, (C) providing external threads on said wall means distally of said ejection ports for threadedly mounting said body in said spark plug aperture, and (D) forming a plurality of flame ejection ports through said wall means adjacent said closed proximal end portion along flame ejection axes which are designedly oriented about said axis and also oriented from parallel to said median plane up to about an angle of 45° diverging therefrom in accordance with the structural configuration of said combustion chamber, whereby flame fronts ejected from said ports will be directed to predetermined areas of greatest fuel-air volumes in said chamber and whereby said flame fronts will travel maximum prescribed distances through said chamber before impinging on metal surfaces.

BRIEF DESCRIPTION OF THE DRAWINGS

The invention will be understood further from the drawings herein and description, wherein the various figures are not necessarily to scale or proportion, and wherein:

FIG. 2-6 are cross-sectional views of the flame generating body of the present device showing variations of the flame ejector nozzle bore;

DETAILED DESCRIPTION

Figure 1:
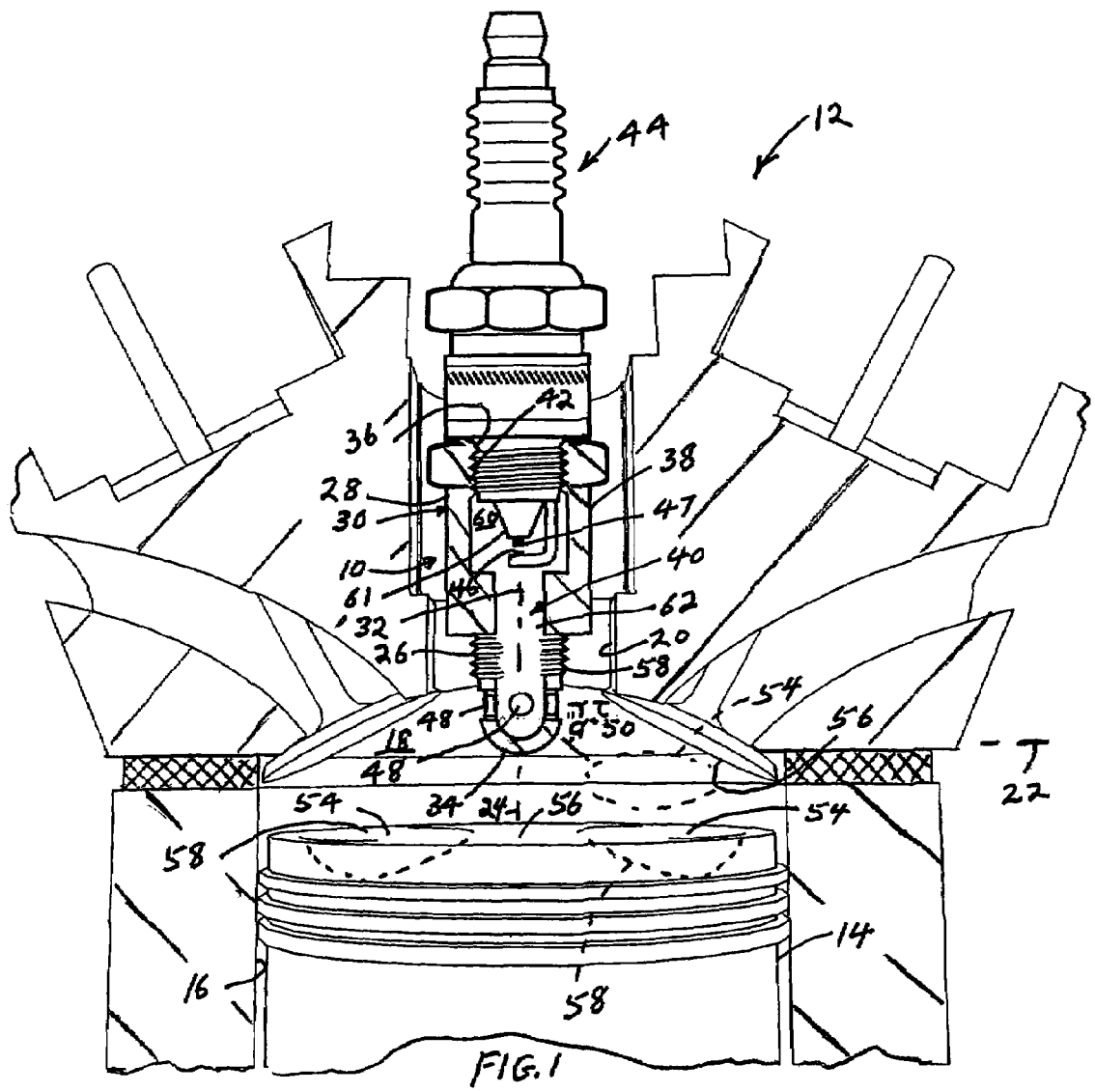
FIG. 1 is a longitudinal partial cross-sectional and perspective view of an internal combustion engine showing a typical approximate relative positioning and mounting of the a preferred embodiment the present ignition (flame ejector) device in an internal combustion engine head with respect to the intake and exhaust valves and combustion chamber in the head and the engine cylinder and piston on the compression stroke.
Figure 7:
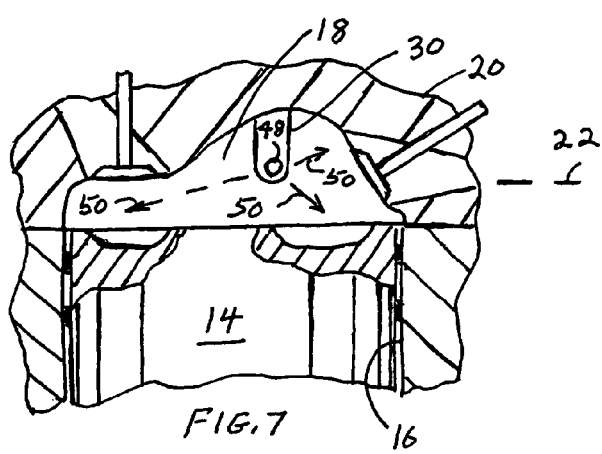
FIG. 7 is a view as in FIG. 1 showing a specially shaped combustion chamber and piston top, and a specially configured arrangement of the ejector nozzles for ejecting the ignition flame toward fuel concentrations in the combustion chamber and/or the piston top.

Further, with reference to the drawings and claims herein, the present flame ejector device 10 is designed for use in an internal combustion engine 12 having one or more pistons 14 reciprocably mounted in cylinders 16, wherein combustion chambers 18 are provided in the engine cylinder head 20, wherein the combustion chambers have a volumetric median plane 22 oriented normally to a reciprocation axis 24 of the pistons, and wherein a threaded spark plug aperture 26 is provided through the head and into communication with each combustion chamber.

The device comprises elongated wall means 28, preferably cylindrical, forming a body 30 having a longitudinal axis 32, the wall means providing the body with a closed proximal end portion 34 an open distal end portion 36 and a tubular intermediate portion 38 housing a passage 40, preferably cylindrical, extending generally axially through the body from the open distal end portion to the closed proximal end portion. The distal end portion 36 has internal threads 42 for threadedly receiving a spark plug 44 whereby the electrode elements 46 and 47 of the plug will be in communication with said passage 40.

A plurality of flame ejection ports 48 are provided through wall means 28 adjacent the closed proximal end portion 34 and have flame ejection axes 50 which are designedly oriented from being parallel to said median plane 22 up to about an angle "α" of 45° diverging therefrom such that flame fronts 52 ejected from the ports will be directed to areas such as, for example, 54 of greatest fuel-air volumes and whereby the flame fronts will travel maximum prescribed distances through said chamber before impinging on metal surfaces such as 56. External threads 58 are formed on wall means 28 distally of the ejection ports for threadedly mounting the body in spark plug aperture 26.

It is noted that when "a piston", "a cylinder", or the like are referred to herein, the plurals of these structures are included.

The device may be secured in the combustion chamber through the threaded hole that once held the spark plug or by casting and/or machining the ejector body along with acceleration tube and nozzle directly in the cylinder head. As shown in FIG. 1, preferably a cavity 60 is machined in body 30 and is the starting place for the ignition flame generation. A smaller hole 62 is drilled the length of the device to within about 0.250 inches of the end 34 of the device and forms the acceleration tube.

Several flame ejector nozzles or ports 48 of approximately 0.125 inch bore diameter are drilled at an angle to the center axis of the acceleration tube. The shape of the pistons and the combustion chambers determines the location, angle, and number of these nozzles. The nozzle angle, preferably, should be such that the exiting flame fronts will travel parallel to the median plane of the combustion chamber. Care should be taken to prevent the flame fronts from being directed toward the piston unless such is desired to ignite fuel in a designed cavity such as the valve relief cavity 58 in the piston top. The sizes of the nozzles depend on the shape of the combustion chamber.

Devices with multiple nozzles of different bore configurations are illustrated in the drawings. The length of the acceleration tube will vary according to the compression ratio. An acceleration tube length of about 1 in. is enough to realize a significant decrease in the time required for complete combustion in the chamber 18. With this device, the time required for the flame to travel across the combustion chamber is significantly reduced by first igniting the fuel at the upper end of the acceleration tube and then introducing the exiting flames from the multi-port nozzles into the combustion chamber, thus creating a significantly larger flame front in a much shorter time.

The depth to which the proximal end 34 and nozzles extend down into the combustion chamber can be designed such that the nozzle bore axes can have a minimum angle "α" or none at all whereby the ejected flame fronts can readily sweep across the combustion chamber through the most dense fuel-air areas and avoid direct impingement on the chamber walls and piston top.

Figure 11:
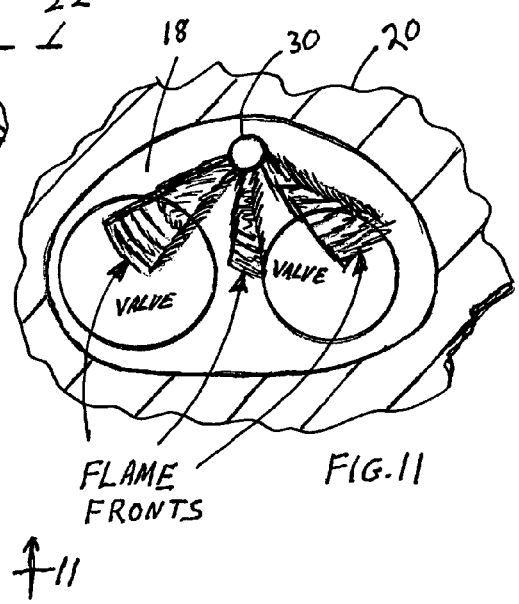
FIG. 11 is a view of the combustion chamber of FIG. 10 taken in the direction of line 11—11 and showing predesigned flame fronts.
Figure 10:
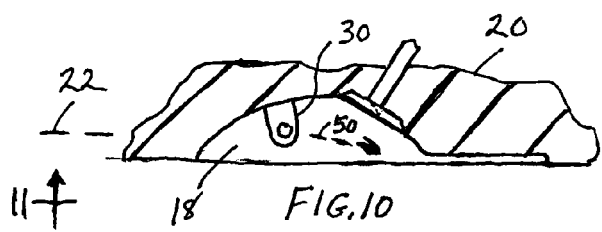
FIG. 10 is a cross-sectional view of combustion chamber with a large quench area.
Figure 8:
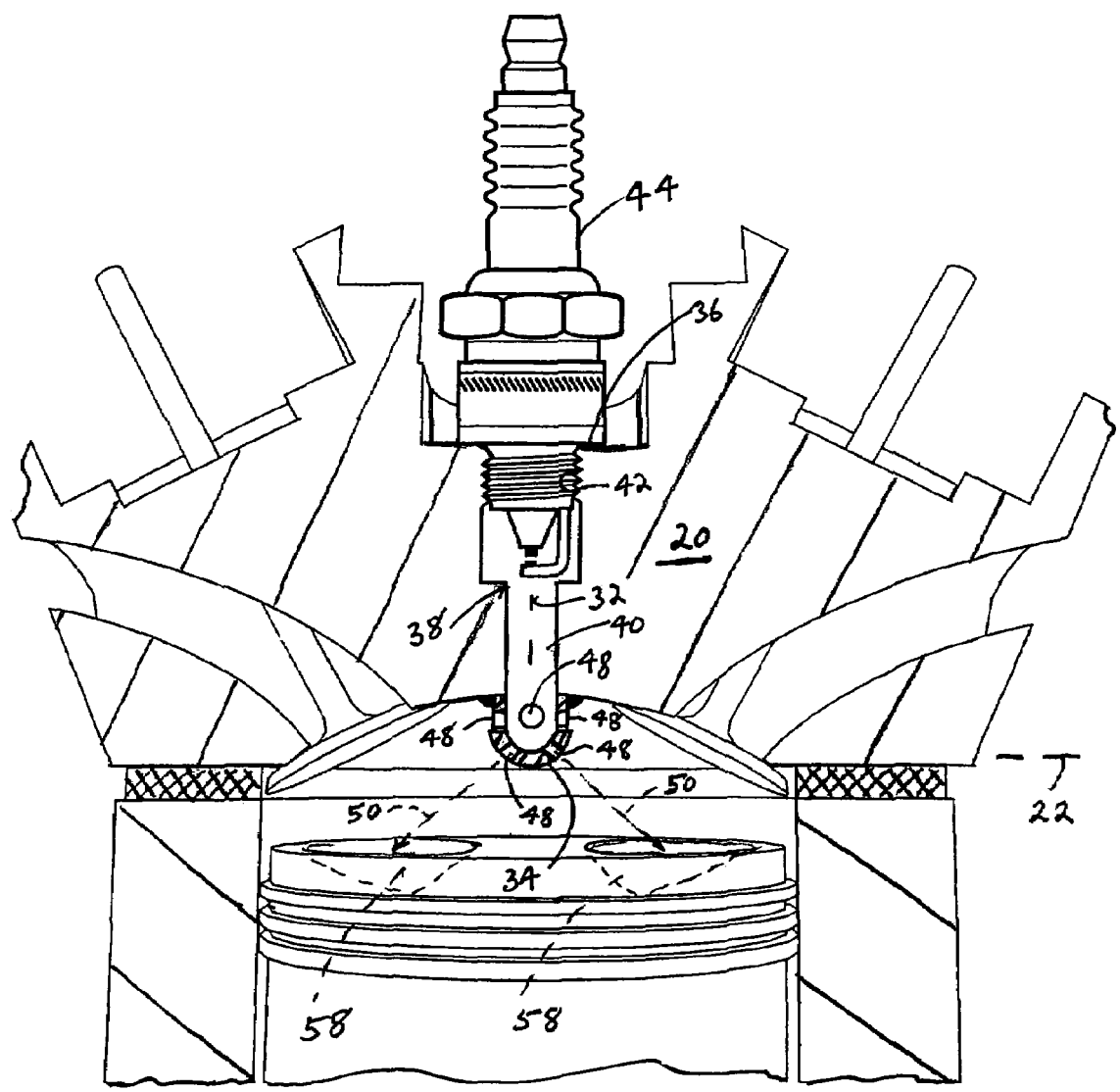
FIG. 8 is a view as in FIG. 1 showing a variation of the present flame ejector formed integral with or pre-affixed to the bottom surface of the cylinder head.

The shape of the nozzle bores would depend upon the shape of the combustion chamber. For example, a hemispherical combustion chamber as in FIG. 8 would have nozzles equally spaced about axis 32 but a cylinder head with a large quench area like a 350 cu. in. Chevy cylinder head, FIGS. 10 and 11, would have nozzles spaced to direct the flame fronts over the intake and exhaust valves.

The velocity of the exiting flame from the nozzle is dependent on the shape of the nozzle. Shown in FIG. 3 is a converging nozzle which will limit the exiting flame velocity to less than the speed of sound. A diverging nozzle as shown in FIG. 4 will allow the exiting flame to exceed the speed of sound. Depending upon the head design it may be desirable to have different nozzle designs at the end of the same acceleration tube. For example, in a high performance engine with high compression the piston top has deep pockets such as 58 machined therein to accommodate the long open durations of the intake and exhaust valves. This relief pocket at the time of ignition contains a significant amount of the fuel and air charge.

The volumetric median plane 22 of any combustion chamber is determined, within practical accuracy, by screwing a conventional spark plug in the spark plug aperture, inverting the head such that the bottom thereof is upwards and horizontal, filling the combustion chamber with fluid, removing and measuring the fluid volume, replacing ½ of the fluid into the combustion chamber and marking its level on opposite points on the combustion chamber wall. This marking designates the median plane.

The present device can be properly affixed in a cylinder head already mounted on an engine by marking the device such as on the top 60 of the body nut 62 wherein the marking will align with a marking on the head when the body 30 is tightened into the spark plug aperture. The types and arrangements of the ejection ports 48 desired for the particular combustion chamber involved will have been previously determined by the engineer and the aforesaid markings made in order to ensure that the ejection axes 50 are properly oriented in the combustion chamber.

In designs like the Chrysler 500 cubic inch Pro Stock engine, the valve relief pocket is located at a the point furthest from the spark plug. As a result, if the fuel detonates it usually occurs in this pocket. The nozzle design for this engine would have a large diverging bore nozzle directing a flame front toward this pocket and a smaller converging bore nozzle pointing generally in the direction of the exhaust valve. An even smaller straight bored nozzle would be placed between the two. The standard spark plug used in the test had an extra long reach 61 (preferred so that a fresh fuel charge injected into passage 40 through ports 48 will quickly reach the electrodes) as shown in FIG. 1. The spark thus occurred down in the fuel cavity 60 and ensured that a combustible mixture was present at the time of ignition although a short reach plug was tried with no recorded misfires.

Figure 9:
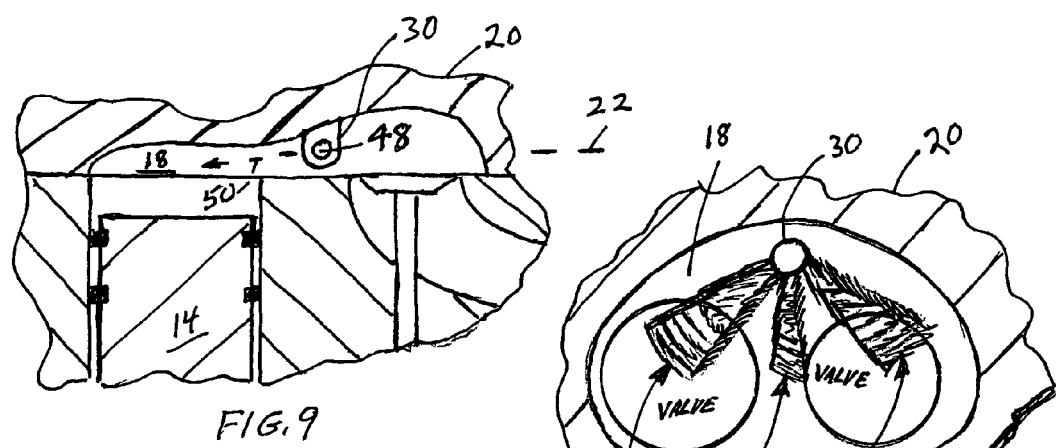
FIG. 9 is a view as in FIG. 7 showing an L head design.

The test engine was a L head design as shown in FIG. 9 with a flat top piston. The crankshaft was connected to a positive displacement hydraulic pump. The pump pressure, flow rate, exhaust gas temperature and cylinder head temperature were recorded for each test run. Using a standard spark plug only and with the engine producing 778 psi at 4000 RPM a metallic knock was heard which is usually a sign of detonation in the combustion chamber. The spark plug was replaced with the present device and no metallic knock was heard at 950 psi at 6500 RPM.

| Typical Performance Data With A L-Head | | |
|---|---|---|
| RPM | Pressure, psi Standard Spark Plug[1] | Pressure, psi Flame Ejector[2] |
| 6000 | 900 | 980 |
| 6200 | 850 | 940 |
| 6400 | 825 | 895 |

[1]These are the maximum pressures obtained at an ignition timing of 36° before Top Dead Center. More or less timing resulted in a loss of pressure.
[2]These are the maximum pressures obtained at an ignition timing of 40° before Top Dead Center. More or less timing resulted in a loss of pressure.

The difference in psi output between the standard spark plug and the present device was about 9.3% under substantially the same operating conditions of ignition timing, throttle setting and RPM.

It is noted that a different shaped combustion chamber will produce different results for the same ignition timing. For example, the pocket 58 for the intake valve clearance has a volume of 13.5 cc. Assuming the volume of the combustion chamber to be 60 cc, then the pocket would represent 22% of the total volume. This % is significant considering it is the most distance point from the spark plug.

The invention has been described in detail with particular reference to preferred embodiments thereof, but it will be understood that variations and modifications will be effected within the spirit and scope of the invention.

I claim:

1. A flame ejector device for use in an internal combustion engine having a piston reciprocably mounted in a cylinder, wherein a combustion chamber is provided in the engine cylinder head, wherein the combustion chamber has a volumetric median plane oriented normally to a reciprocation axis of the piston, and wherein a threaded spark plug aperture is provided through the head and into communication with the combustion chamber, said device comprising elongated wall means forming a body having a longitudinal axis, said wall means providing said body with a closed proximal end portion, an open distal end portion and a tubular intermediate portion housing a passage extending generally axially through said body from said open distal end portion to said closed proximal end portion, said distal end portion having internal threads for threadedly receiving a spark plug whereby the electrode elements of the plug will be in communication with said passage, a plurality of flame ejection ports provided through said wall means adjacent said closed proximal end portion and having flame ejection axes which are designedly oriented from parallel to said median plane up to about an angle of 45° diverging therefrom such that flame fronts ejected from said ports will be directed to predetermined areas of greatest fuel-air volumes and whereby said flame fronts will travel maximum prescribed distances through said chamber before impinging on metal surfaces, and external threads on said wall means distally of said ejection ports for threadedly mounting said body in said spark plug aperture, wherein said passage is configured to provide a distal ignition cavity in which said electrode elements are to be positioned, and is further configured to provide an acceleration tube proximally of said cavity and communicating directly with said ejection ports, wherein the ratio of the length of said tube to the length of said cavity is from about 1.0/1.0 to about 12.0/1.0.

2. The device of claim 1 wherein said angle is proximally of said median plane.

3. The device of claim 1 wherein from 2 to 8 ejection ports are provided and wherein the flame ejection axis of at least one of said ports diverges proximally from said median plane at an angle of less than about 20°.

4. The device of claim 3 wherein said angle is less than about 10°.

5. The device of claim 1 wherein the configuration of each port is a member individually selected from the group consisting essentially of a straight bore, a converging bore or a diverging bore, whereby the speeds and distance patterns of ejected flame fronts are varied in accordance with the configuration of a particular combustion chamber.

6. The device of claim 1 wherein the cross-sectional configuration of each port is a member selected from the group consisting essentially of a slot, a round aperture or a wedge.

7. The device of claim 1 wherein a spark plug is threadedly mounted in said distal end portion.

8. The combination of an internal combustion engine and a flame ejector device, said engine having a piston reciprocably mounted in a cylinder, wherein a combustion chamber is provided in the engine cylinder head, wherein the combustion chamber has a volumetric median plane oriented normally to a reciprocation axis of the piston, and wherein a threaded spark plug aperture is provided through the head and into communication with the combustion chamber, wherein said device comprises elongated wall means forming a body having a longitudinal axis, a closed proximal end portion and an open distal end portion and a tubular intermediate portion, a fluid flow passage extending generally axially through said body from said open distal end portion to said closed proximal end portion, said distal end portion having internal threads for threadedly receiving a spark plug whereby the electrode elements of the plug will be in communication with said passage, a plurality of flame ejection ports provided through said wall means adjacent said closed proximal end portion and communicating with said passage, said ports having flame ejection axes which are designedly oriented from parallel to said median plane up to about an angle of 45° diverging therefrom such that flame fronts ejected from said ports will be directed to predetermined areas of greatest fuel-air volumes and whereby said flame fronts will travel maximum prescribed distances through said chamber before impinging on metal surfaces, and external threads on said wall means distally of said ejection ports threadedly mounting said body in said spark plug aperture, wherein said passage is configured to provide a distal ignition cavity in which said electrode elements are to be positioned, and is further configured to provide an acceleration tube proximally of said cavity and communicating directly with said ejection ports, wherein the ratio of the volumetric capacity of said cavity to the volumetric capacity of said tube is from about 4.0/1 to about 0.25/1.0 and wherein the ratio of the length of said tube to the length of said cavity is from about 1.5/1.0 to about 2.5/1.0.

9. The combination of claim 8 wherein said angle is proximally of said median plane.

10. The combination of claim 8 wherein from 2 to 8 ejection ports are provided and wherein the flame ejection axis of at least one of said ports diverges proximally from said median plane at an angle of less than about 20°.

11. The combination of claim 10 wherein said angle is less than about 10°.

12. The combination of claim 8 wherein the configuration of each port is a member individually selected from the group consisting essentially of a straight bore, a converging bore or a diverging bore, whereby the speeds and distance patterns of ejected flame fronts are varied in accordance with the configuration of a particular combustion chamber.

13. The combination of claim 8 wherein the cross-sectional configuration of each port is a member selected from the group consisting essentially of a slot, a round aperture or a wedge.

14. The method for manufacturing a flame ejector device for subsequent assembly in the head of an internal combustion engine having a piston reciprocably mounted in a cylinder, wherein a combustion chamber is provided in the head, wherein the combustion chamber has a volumetric median plane oriented normally to a reciprocation axis of the piston, and wherein a threaded spark plug aperture is provided through the head and into communication with the combustion chamber, said method comprising (A) determining the type and orientation of flame ejector ports desired for a particular combustion chamber, (B) providing a flame ejector structure comprising elongated wall means forming a body having a longitudinal axis, a closed proximal end portion and an open distal end portion and an intermediate portion, a fluid flow passage being formed generally axially through said body from said open distal end portion to said closed proximal end portion, said distal end portion having axially oriented internal threads for threadedly receiving a spark plug whereby the electrode elements of the plug will be in communication with said passage, wherein said passage is configured to provide a distal ignition cavity in which said electrode elements are to be positioned, and is further configured to provide an acceleration tube proximally of said cavity and communicating directly with said ejection ports, wherein the ratio of the length of said tube to the length of said cavity is from about 1.0/1.0 to about 12.0/1.0.

(C) providing external threads on said wall means distally of said ejection ports for threadedly mounting said body in said spark plug aperture, and (D) forming a plurality of flame ejection ports through said wall means adjacent said closed proximal end portion along flame ejection axes which are designedly oriented about said axis and also oriented from parallel to said median plane up to about an angle of 45° diverging therefrom in accordance with the structural configuration of said combustion chamber, whereby flame fronts ejected from said ports will be directed to areas of greatest fuel-air volumes in said chamber and whereby said flame fronts will travel maximum prescribed distances through said chamber before impinging on metal surfaces.

15. The method of claim 14 wherein the configuration of each port is a member individually selected from the group consisting essentially of a straight bore, a converging bore or a diverging bore and wherein the cross-sectional configuration of each port is a member selected from the group consisting essentially of a slot, a round aperture or a wedge, whereby the speeds and distance patterns of ejected flame fronts are varied in accordance with the configuration of a particular combustion chamber.

16. A cylinder head for an internal combustion engine wherein said head has a top surface, a bottom surface and a combustion chamber formed in said bottom surface, elongated wall means depending from said bottom surface and forming a body having a longitudinal axis, said wall means providing said body with a closed proximal end portion, an open distal end portion and a tubular intermediate portion housing a fluid flow passage extending generally axially through said body from said open distal end portion to said closed proximal end portion, a spark plug aperture formed through said head axially of said distal end portion and having internal threads for threadedly receiving a spark plug whereby the electrode elements of the plug will be in communication with said passage, a plurality of flame ejection ports provided through said wall means adjacent said closed proximal end portion and having flame ejection axes which are designedly oriented from parallel to said median plane up to about an angle of 45° diverging therefrom such that flame fronts ejected from said ports will be directed to predetermined areas of greatest fuel-air volumes and whereby said flame fronts will travel maximum prescribed distances through said chamber before impinging on metal surfaces, wherein said passage is configured to provide a distal ignition cavity in which said electrode elements are to be positioned, and is further configured to provide an acceleration tube proximally of said cavity and communicating directly with said ejection ports, wherein the ratio of the length of said tube to the length of said cavity is from about 1.0/1.0 to about 12.0/1.0.

* * * * *